(12) United States Patent  (10) Patent No.: US 7,422,461 B2
Chen  (45) Date of Patent: Sep. 9, 2008

(54) INTEGRATED CIRCUIT CARD HOLDER

(75) Inventor: Chao Chen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/733,494

(22) Filed: Apr. 10, 2007

(65) Prior Publication Data

US 2008/0124965 A1   May 29, 2008

Related U.S. Application Data

(63) Continuation of application No. 11/434,158, filed on May 16, 2006, now Pat. No. 7,217,148.

(51) Int. Cl.
*H01R 13/62* (2006.01)
*H01R 24/00* (2006.01)

(52) U.S. Cl. .................. 439/326; 439/630; 235/441

(58) Field of Classification Search .................. 439/326, 439/630; 235/441
See application file for complete search history.

(56) References Cited

U.S. PATENT DOCUMENTS

| | | | |
|---|---|---|---|
| 6,761,575 B2 * | 7/2004 | Bricaud et al. ............... 439/326 |
| 7,033,222 B2 * | 4/2006 | Kitamura ..................... 439/630 |
| 7,217,148 B1 * | 5/2007 | Chen ........................... 439/326 |
| 7,255,605 B2 * | 8/2007 | Chen et al. ................... 439/630 |
| 2001/0032882 A1 | 10/2001 | Roussy et al. |
| 2003/0022537 A1 | 1/2003 | Bricaud et al. |
| 2004/0198444 A1 | 10/2004 | Chen |
| 2006/0205279 A1 * | 9/2006 | Pan ............................. 439/630 |

FOREIGN PATENT DOCUMENTS

| | | |
|---|---|---|
| DE | 101 12 259 A 1 | 3/2000 |
| DE | 202 15 561 U 1 | 7/2002 |

* cited by examiner

*Primary Examiner*—Tho D Ta (57) ABSTRACT

A holder for an integrated circuit card, such as a Subscriber Identity Module (SIM) card, has a laterally extending non-conductive base. A pair of opposed abutments extend above the base. A first abutment of the pair of abutments is resilient such that a distance between the first abutment and a second abutment of the pair of abutments may be increased by urging the first abutment away from said second abutment. A first lip extends above the first abutment and projects toward the second abutment. A second lip extends above or from the second abutment and projects toward the first abutment. A plurality of resilient electrical contacts projects upwardly from said base between the pair of abutments.

11 Claims, 8 Drawing Sheets

INTEGRATED CIRCUIT CARD HOLDER

CROSS-REFERENCE TO RELATED APPLICATIONS

This application is a continuation of application Ser. No. 11/434,158 filed May 16, 2006 now U.S. Pat. No. 7,217,148, the contents of which are incorporated by reference hereinto.

FIELD OF THE INVENTION

The present invention relates to an integrated circuit card holder, such as a Subscriber Identity Module (SIM) card holder.

BACKGROUND OF THE INVENTION

A SIM card is a smart card (a form of integrated circuit card) that is used with a Global System for Mobile Communications (GSM) cellular phone to encrypt voice and data transmissions and store user data permitting user identification and authentication on a network providing phone service. The SIM card also stores data such as the preferred phone settings of the user and a list of commonly dialled telephone numbers. A SIM card can be moved between telephones, and more than one SIM card can be used with one phone. For example, a cellular telephone with a first installed SIM card may be used for business calls, and the same telephone with a second installed SIM card may be used for personal calls.

To facilitate the use of SIM cards as described above, many cellular telephones incorporate a SIM card holder that permit a SIM card to be easily installed without tools. For example, one known type of SIM card holder essentially consists of a rigid "pocket" that is mounted flat against a printed circuit board (PCB) within the telephone unit. A SIM card is inserted into the pocket with a sliding motion. The holder has elastic electrical contacts which come into contact with contact pads on the SIM card to form an electrical connection between the PCB and the inserted card. In certain holders of this type, about one half of the footprint (i.e. extent) of the inserted SIM card (the half with the contact pads) is within the holder when the card is inserted. The remaining half of the SIM card footprint extends beyond the holder and lies in a plane that is parallel to and slightly above the surface of the PCB. Below the extending half of the card, only low-profile components, e.g. resistors or capacitors that are no more than about 1 millimeter in height, are mounted to the PCB surface, to avoid mechanically obstructing the overlying SIM card.

Use of the above-described type of SIM card holder may be problematic in that PCB components even beyond the footprint of the installed SIM card may need to be kept clear of the plane of the SIM card in order to facilitate card insertion and removal. For example, if the holder is centrally mounted on a PCB, it may be necessary to refrain from mounting high-profile components in area adjacent to the holder that is the same size as the entire SIM card footprint. This is so that the SIM card may be laid flat against the PCB surface in order to position it for insertion into the pocket. A PCB designer may be impeded from utilizing desired components in this adjacent area as a result.

An alternative integrated circuit card holder would be desirable.

BRIEF DESCRIPTION OF THE DRAWINGS

In the figures which illustrate an example embodiment of the invention.

DETAILED DESCRIPTION OF EXEMPLARY EMBODIMENTS

In one aspect of the below-described embodiment, there is provided a holder for an integrated circuit card comprising: a laterally extending non-conductive base; a pair of opposed abutments extending above the base, a first abutment of the pair of abutments being resilient such that a distance between the first abutment and a second abutment of the pair of abutments may be increased by urging the first abutment away from the second abutment; a first lip extending above the first abutment and projecting toward the second abutment; a second lip extending above or from the second abutment and projecting toward the first abutment; a plurality of resilient electrical contacts projecting upwardly from the base between the pair of abutments.

In another aspect of the below-described embodiment there is provided a holder for an integrated circuit card comprising: a laterally extending non-conductive base; a pair of opposed abutments extending above said base, a first abutment of said pair of abutments being a resilient leaf spring such that a distance between said first abutment and a second abutment of said pair of abutments may be increased by urging said first abutment away from said second abutment; a first lip extending above said first abutment and projecting toward said second abutment; a second lip extending from an upper end of said second abutment and projecting toward said first abutment; a plurality of resilient electrical contacts projecting upwardly from said base between said pair of abutments; and stops for pre-loading said leaf spring positioned at opposite ends of said leaf spring, said stops being formed by a side of said first lip remote from said second lip, wherein said second abutment and said second lip have a first end portion and a second end portion spaced by a medial gap, said base has a notch registered with said medial gap, and said base further has a central region that is substantially flat and downwardly sloping areas extending from said central region toward each of said pair of opposed abutments.

Referring to FIGS. 1-4, an integrated circuit card holder 10 is illustrated. The holder 10 is designed to hold an integrated circuit card of width W and thickness T. The holder 10 has a base 12 made from an electrically non-conductive material, such as plastic or glass-filled plastic. The central region 13 (FIG. 3) of the base is substantially flat. The base 12 has two ends 14 and 16. The base slopes downwardly at its ends 14 and 16 (see FIG. 3).

Figure 6A:
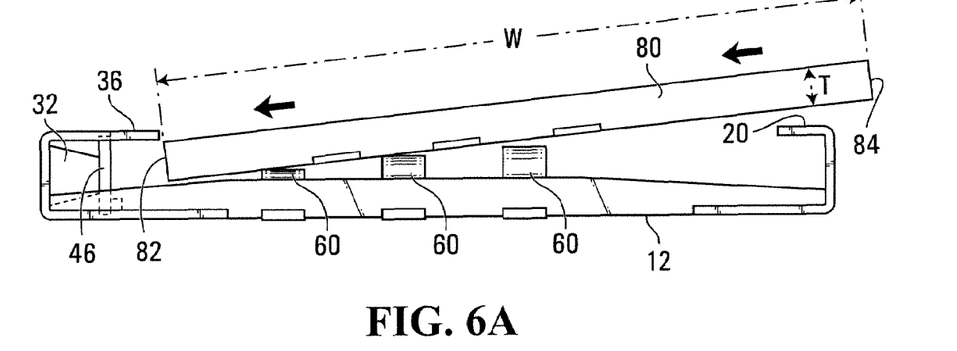
FIGS. 6A, 6B and 6C are side elevation views illustrating the installation of an integrated circuit card into the holder of FIG. 1.

A unitary, U-shaped bracket 24 is attached to end 14 of base 12. The bracket 24 may be formed from a metal such as stainless steel, copper or cold-rolled steel for example, e.g. by way of a stamping process. The bracket 24 may be attached to base 12 by injection molding of the plastic forming base 12 through holes 26 formed in the bracket 24 (see FIG. 2). The bracket 24 has an abutment 18 extending upwardly from the base 12, forming a right angle with the base and a lip 20 that extends towards the second end 16 of the base 12. The lip 20 forms a right angle with the abutment 18. The separation between the lip 20 and the central region 13 of base 12 is equal to T. Due to the downward slope of base 12 at end 14, the separation between the lip 20 and the surface of base 12 is slightly larger than T (FIG. 6A). This separation, which is denoted "T+" in FIGS. 1 and 3, will accommodate an integrated circuit card during its installation into holder 10.

The abutment 18 has a medial gap 22 (FIG. 1) that is wider than an average human finger which facilitates removal of the integrated circuit card from the holder 10. A notch 23 in base 12 is registered with the gap 22 and further facilitates card removal.

Figure 4:
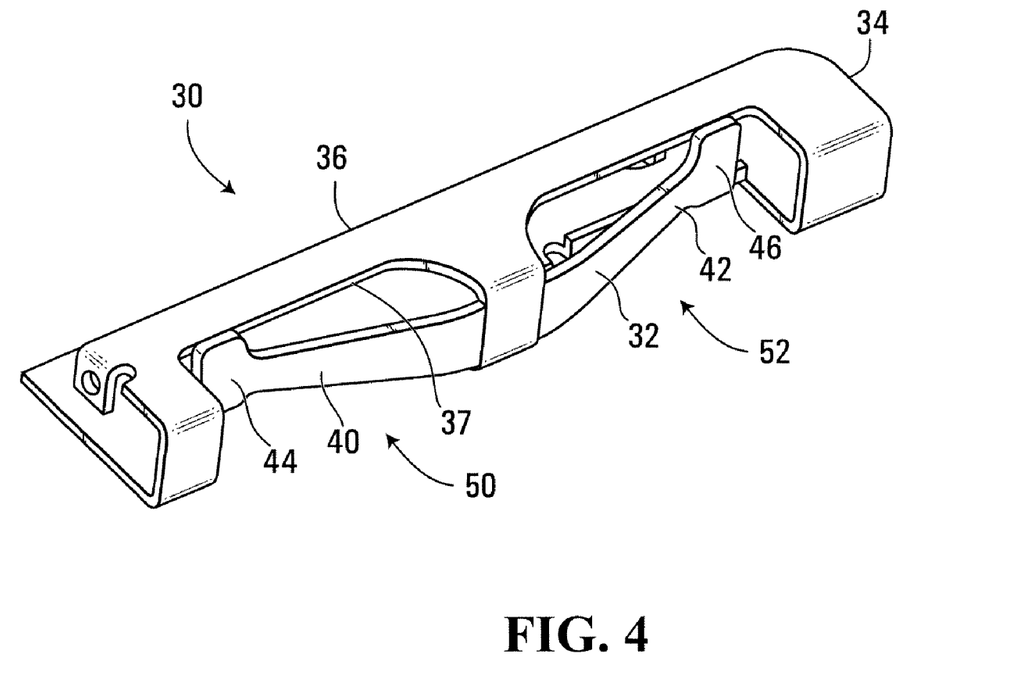
FIG. 4 is perspective view of a component of the integrated circuit card holder of FIG. 1.

At the other end 16 of base 12, an assembly 30 is attached to the base. The assembly has a generally U-shaped bracket with a central nose 35 which holds a resilient abutment 32. As with bracket 24, the attachment of bracket 34 to base 12 may also be through injection molding (e.g. bracket 24 and assembly 30 may be placed into a mold into which molten plastic forming base 12 is injected). The assembly 30 is shown in FIG. 4 prior to its attachment to base 12 and in FIGS. 1-3 after its attachment to base 12. The assembly 30 may be made from the same material as bracket 24.

Figure 1:
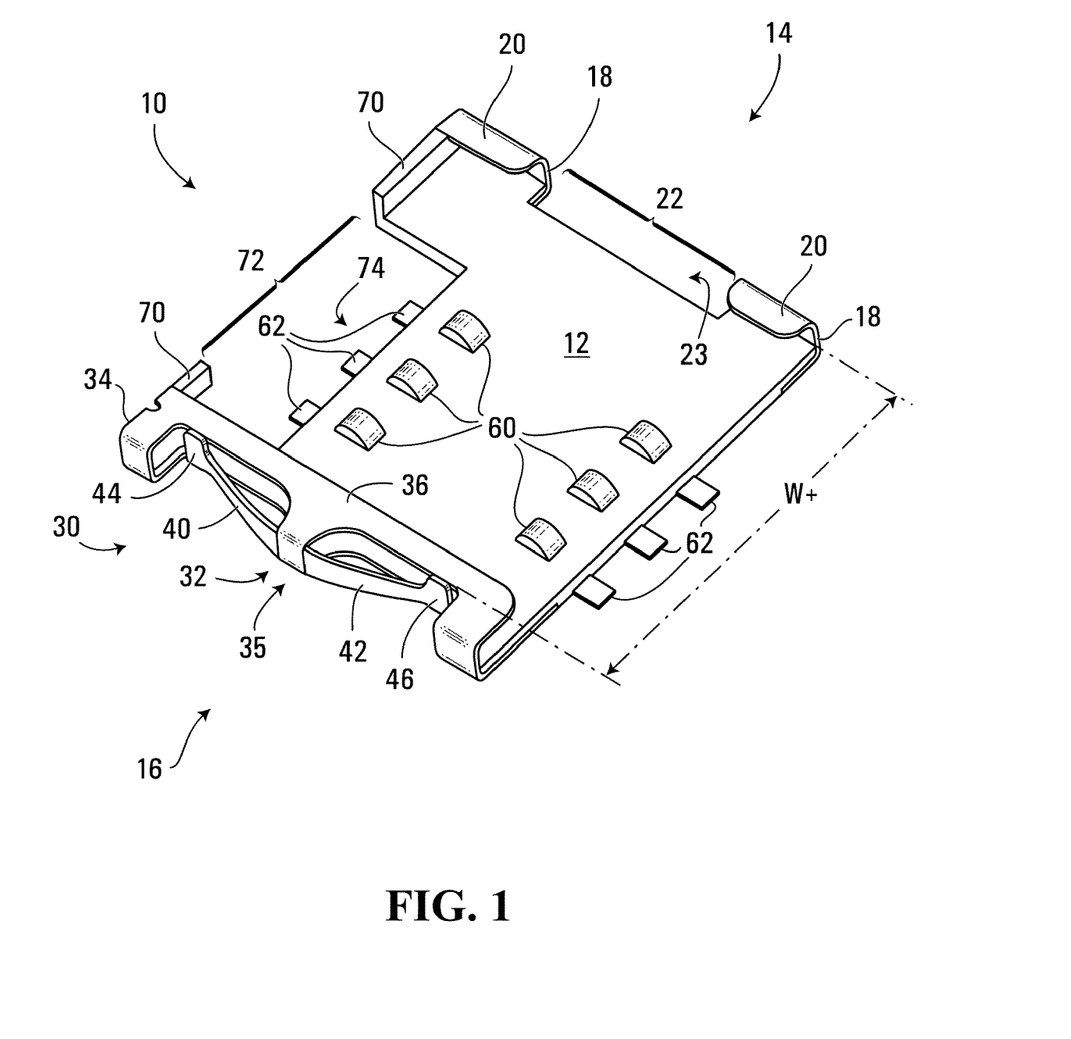
FIG. 1 is a perspective view of an integrated circuit card holder.
Figure 2:
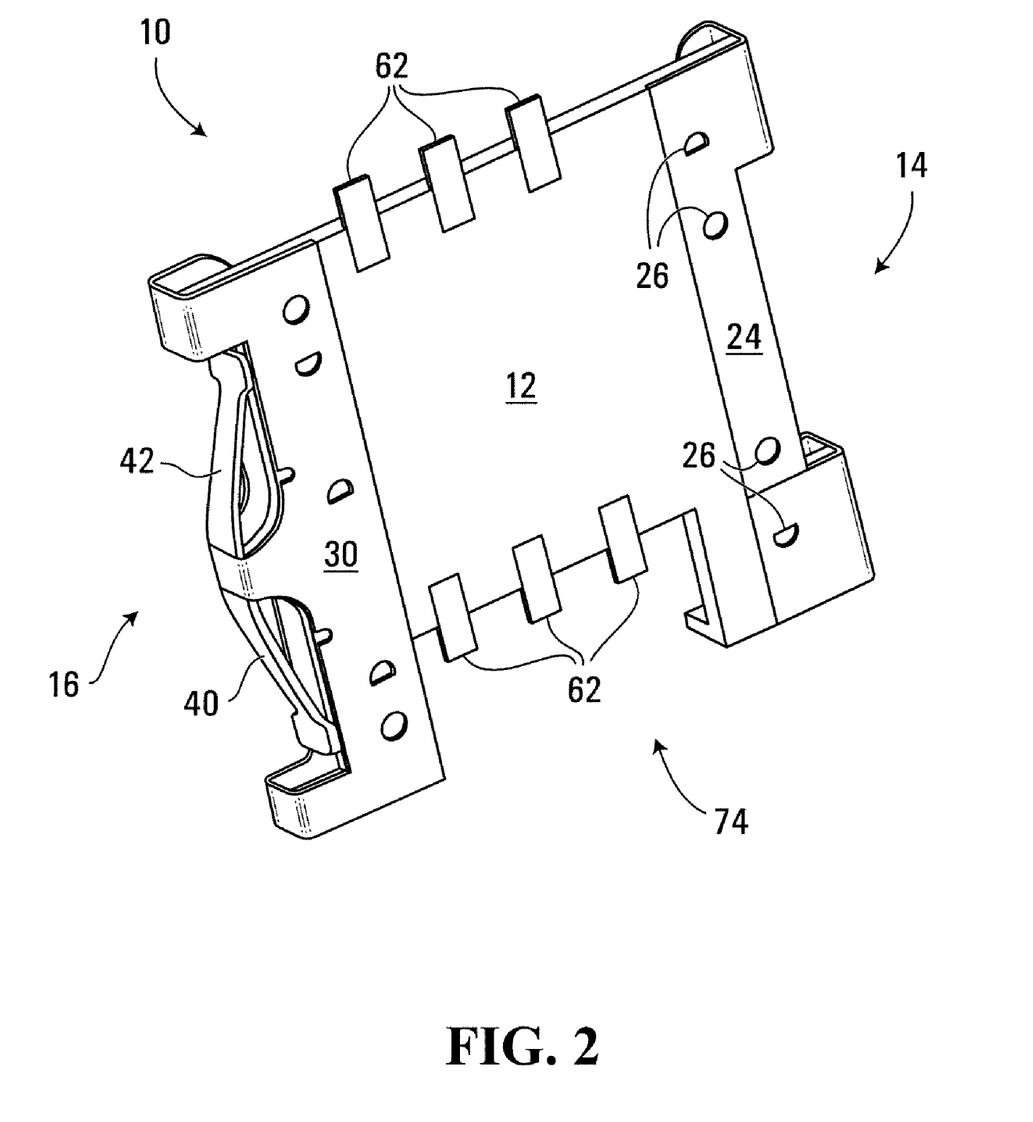
FIG. 2 is a side elevation view of the integrated circuit card holder of FIG. 1.
Figure 3:
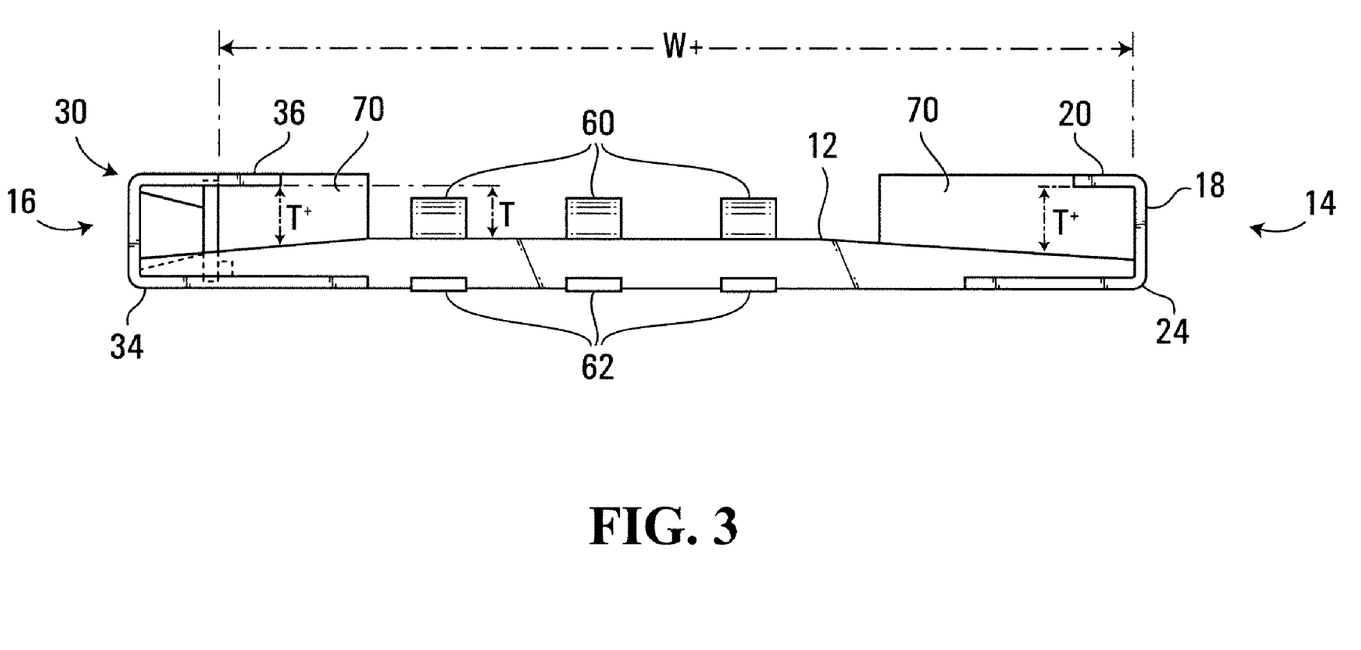
FIG. 3 is a perspective view of the underside of the integrated circuit card holder of FIG. 1.

Referring to FIG. 1 along with FIG. 4, resilient abutment 32 is a leaf spring with two arms 40 and 42 that extend into cutout portions 50 and 52 of bracket 34, respectively. The arms 40 and 42 of spring 32 end in tabs 44 and 46 respectively. The distance between the opposing abutment 18 and tabs 44, 46 is slightly larger than W (denoted "W+" in FIGS. 1 and 2) in order to accommodate an integrated circuit card installed in holder 10. The leaf spring 32 is preloaded, i.e. partially compressed, with the arms 40 and 42 being partially flexed even when the holder 10 is empty. In particular, spring force presses tabs 44 and 46 against the outer edge of bracket 34 and the edge of base 12 (see, e.g., FIGS. 1 and 3, which act as stops). The preloading is not required, but may improve the ability of holder 10 to keep an installed integrated circuit card in position within the holder as compared to a non-preloaded spring. The spring 32 is capable of compression in a compression direction away from outer edge 37 and abutment 18 during integrated circuit card installation and removal. Resilient abutment 32 may be referred to as the "first abutment" while abutment 18 may be referred to as the "second abutment".

Bracket 34 has a lip 36 that projects towards the abutment 18 at the first end 14 of base 12. Like lip 20, lip 36 is separated from the surface of base 12 by separation T+. Lip 36 may be referred to as the "first lip" while lip 20 may be referred to as the "second lip".

Figure 5A:
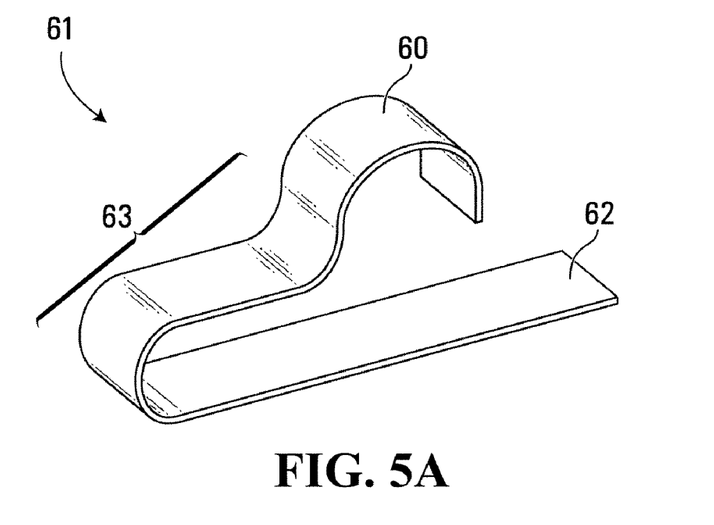
FIG. 5A illustrates an electrical contact of the holder of FIG. 1 in greater detail.

As shown in FIG. 1, six electrical contacts 60 are mounted in the base 12 in an arrangement that is suitable for contacting contact pads in the face of an installed SIM card. Each of the contacts 60 is formed from one end of a thin strip 61 of electrically conductive material (such as a resilient metal), which end is bent into a convex shape, as shown in FIG. 5A. The strip 61 also has a basal end 62 and a neck 63 which extends between end 62 and contact 60. Neck 63 is received through an aperture 65 in base 12. When contact 60 is depressed, it produces an upward spring force. End 62 of each strip extends along the underside of the base 12 and beyond its margin. The ends 62 are intended for electrical connection to printed circuit board leads.

Figure 5B:
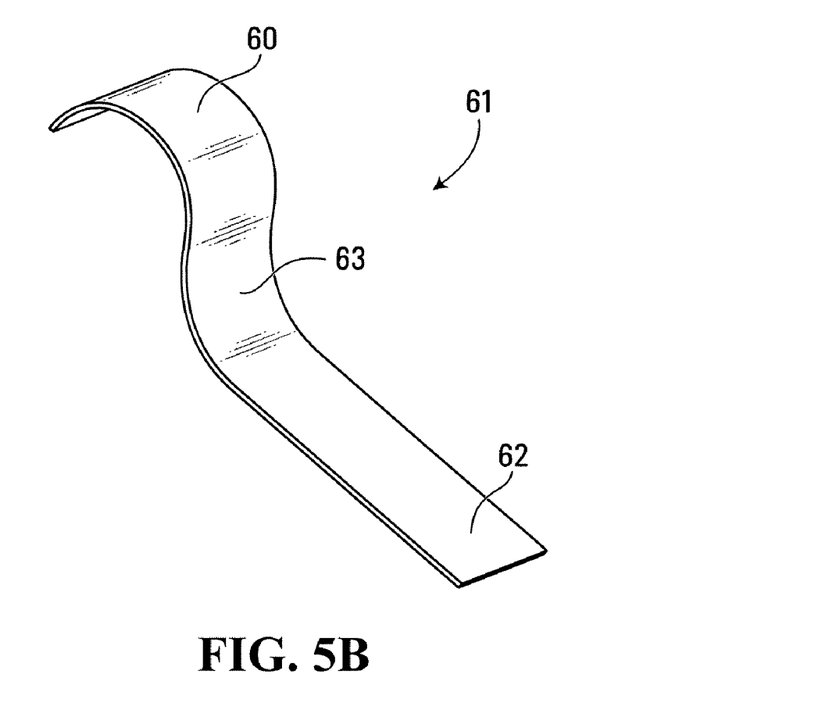
FIG. 5B illustrates an alternative form of electrical contact to the one shown in FIG. 5A.

An alternative shape of metal strip 61 having a contact portion 60, basal end 62 and neck 63 is shown in FIG. 5B.

Referring to FIG. 1, the base 12 has an additional abutment 70 (FIG. 1) along one of its sides. The abutment 70 takes the form of an upstanding lip having a gap 72 therein. The gap results from a notch 74 of the base 12 into which the ends 62 of three contacts 60 extend. The notch 74 allows the ends 62 of the three contacts to extend beyond the margin of the base 12 of the holder without extending beyond the main footprint of the holder 10; this may conserve real estate on a printed circuit board onto which the holder 10 is mounted.

Figure 6B:
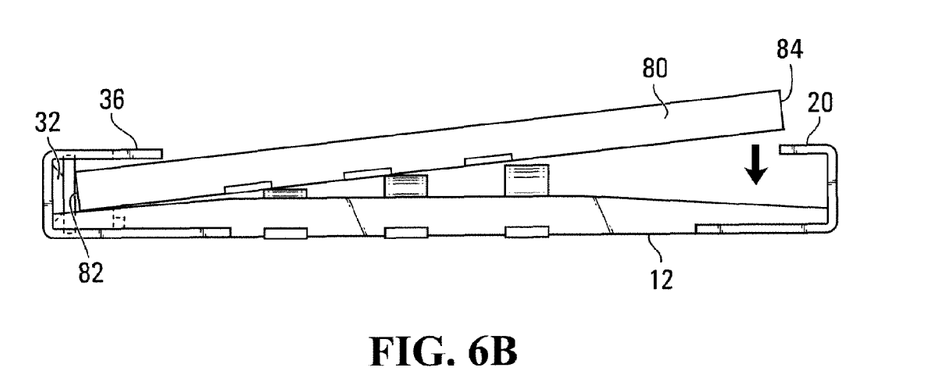
Figure 6C:
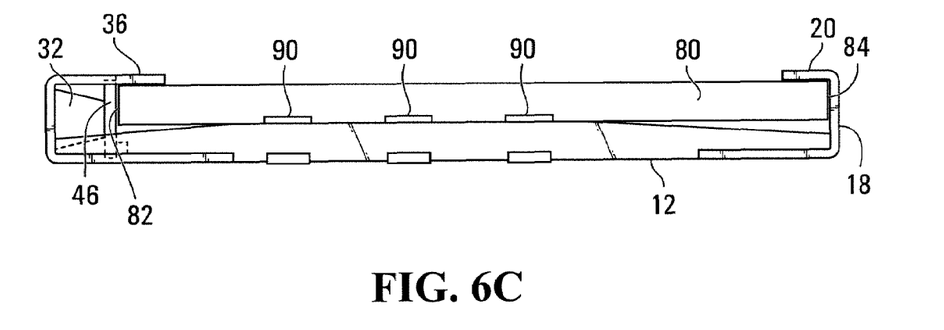

Installation of a SIM card 80 into the holder 10 is illustrated in FIGS. 6A to 6C. Referring to FIG. 6A, a user initially holds the card 80 on an angle with respect to the base 12 as shown. The card is translated into the holder 10 towards assembly 30 until leading edge 82 of the card comes into contact with the tabs 44, 46 of leaf spring 32. Application of pressure upon the opposing card edge 84 towards spring 32 causes the spring 32 to compress. The spring 32 is compressed sufficiently for the opposing edge 84 to clear lip 20, as shown in FIG. 6B. The opposing edge 84 is then lowered past lip 20 towards the base 12 with spring compression being maintained.

The edge 84 is then released. The spring 32 decompresses and urges the SIM card 80 into an installed position in which edge 84 of card 80 abuts the abutment 18, as shown in FIG. 6C. The tabs 44, 46 at the ends of the arms 40, 42 of spring 32 are returned to their original, preloaded position. In this position, the tabs 44, 46 are adjacent to the leading edge 82 of card 80 but are not continually applying pressure to the card 80. If the holder 10 is jarred such that SIM card 80 is driven into the preloaded leaf spring 32, the spring absorbs the shock of the jarring and returns the card 80 to its installed position as shown in FIG. 6C.

When the SIM card 80 has been installed, contact pads 90 on its lower face are positioned directly over the contacts 60. The presence of SIM card 80 causes the contacts 60 to be downwardly depressed. The resiliency of the contacts 60 resists this depression and helps to maintain the contacts 60 in positive contact with the contact pads 90. The resiliency of contacts 60 also tends to press the SIM card 80 up against the first and second lips 36 and 20, which mechanically obstruct upward movement of the card 80. This helps to keep the card 80 in position within the holder 10.

Figure 7:
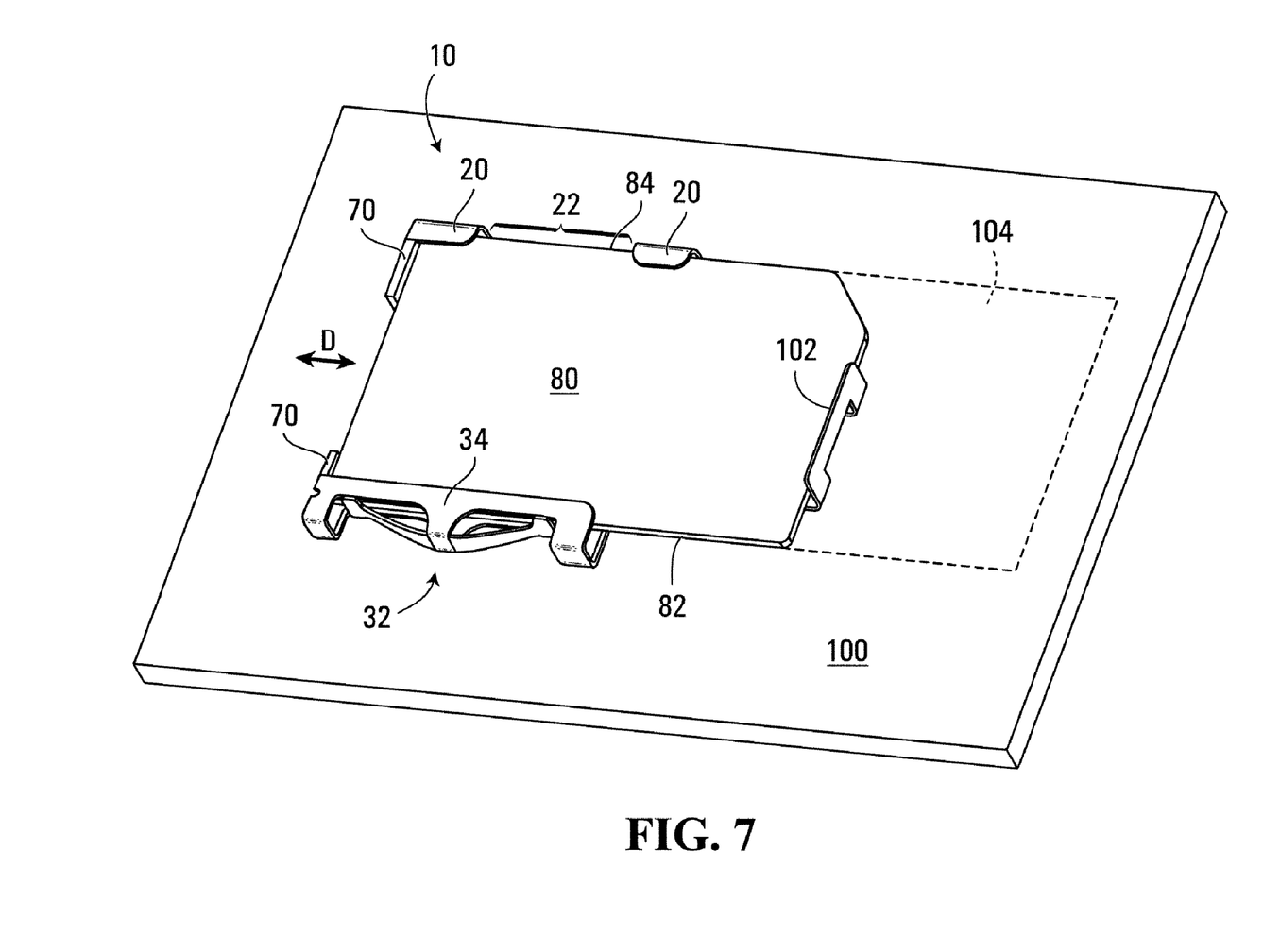
FIG. 7 is a perspective view of the integrated circuit card holder of FIG. 1 mounted to a printed circuit board and holding an installed integrated circuit card.

FIG. 7 is a perspective view of the holder 10 with an installed SIM card 80. The holder 10 is mounted to a printed circuit board 100, e.g. using conventional surface mount technology. In the illustrated embodiment, the overall footprint of the holder 10 is approximately one-half of the footprint of the SIM card 80. The size of the holder may vary in relation to the size of the card in alternative embodiments.

One edge of SIM card 80 abuts upstanding lip 70 and the opposing edge abuts a stopper 102. Stopper 102 is a form of abutment which may be a dedicated component (e.g. an upstanding tab as shown in FIG. 7) or a strategically placed component having another purpose beyond simply acting as a stopper, such as a shielding can used to shield an RF transmitter for example. The stopper 120 and lip 70 cooperate to keep the card 80 in place longitudinally (i.e. in direction D).

Given the manner of installation of SIM card 80 into holder 10 from above the holder, it is possible to situate high-profile components within area 104 of the printed circuit board 100, adjacent to the installed card 80, without impeding installation or removal of card 80.

To remove the SIM card 80 from holder 10, the installation procedure is reversed. Gap 22 may facilitate removal of the card 80 by providing an exposed portion of edge 84 for card manipulation.

As will be appreciated by those skilled in the art, modifications to the above-described embodiment can be made without departing from the essence of the invention.

Figure 8A:
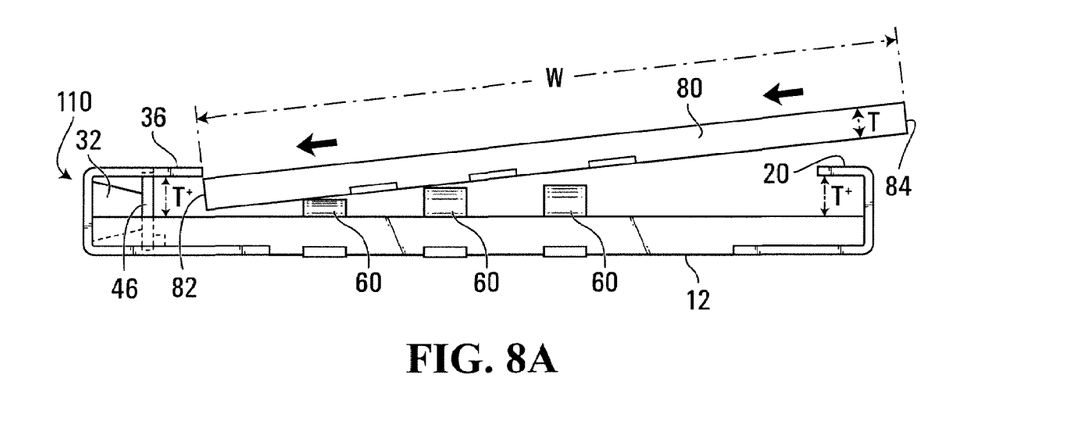
FIGS. 8A, 8B and 8C are side elevation views of an alternative embodiment of the card holder showing installation of an integrated circuit card.
Figure 8B:
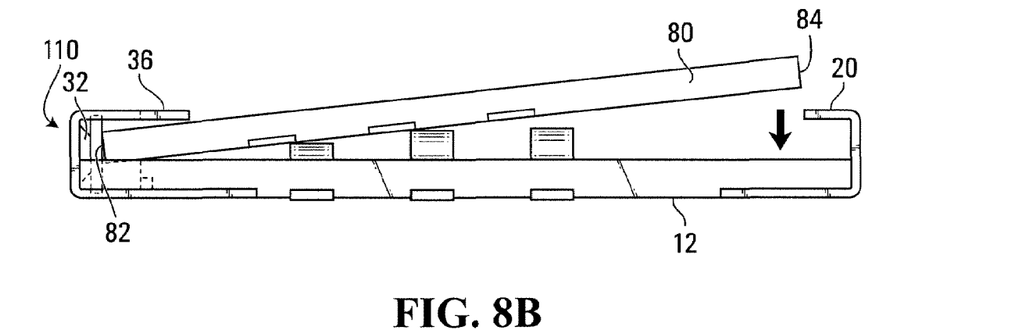
Figure 8C:
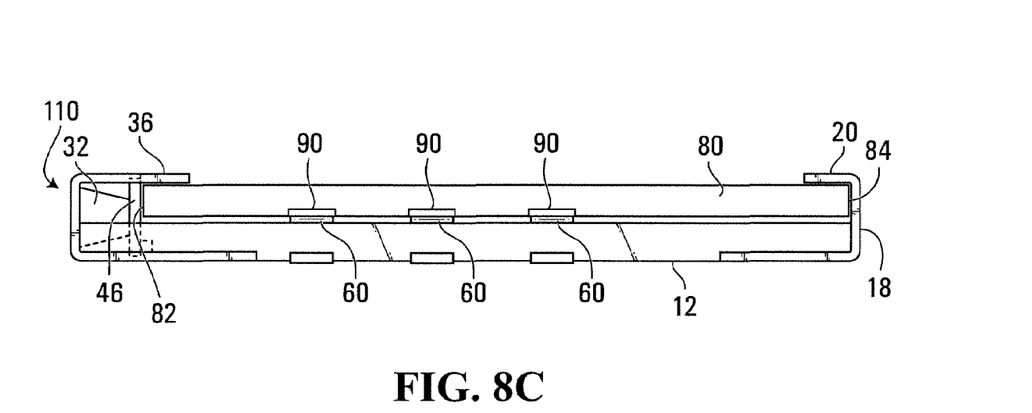

For example, in some embodiments the upper surface of base 12 may be substantially flat, without downwardly sloping portions at ends 14 and 16. Such an alternative embodiment holder 110 is illustrated in FIGS. 8A to 8C. In the illustrated embodiment, the separation between the lip 36 and base 12 is slightly larger than the thickness T of the integrated circuit card to be held to facilitate card installation. The separation between lip 20 and base 12 may similarly be slightly larger than T. Installation of an integrated circuit card 80 into the holder 110 is illustrated in FIGS. 8A to 8C.

In some embodiments, the distance between the opposing abutment 18 and tabs 44, 46 may be slightly less than W when the holder 10 is empty. In such embodiments, the resilient abutment 32 continually applies pressure upon the edge 82 of an installed card 80. This may be sufficient to keep the card 80 in place for certain applications, even in the absence of lip 70 and stopper 102. Of course, if lip 70 and stopper 102 are omitted, the risk of an intermittent electrical connection between the contacts 60 and pads 90 may increase due to possible movement of the card 80 in the longitudinal direction D.

In some embodiments, the end portions 62 of some or all of the wire strips 61 may not extend beyond a margin of the base. Rather, the ends 62 could be situated under the base 12 near its margin.

In some embodiments, the resilient abutment 32 may not be a leaf spring. Alternative embodiments may employ other types of springs or resilient abutments.

Alternative embodiments may not be assembled from multiple components such as a bracket 24, an assembly 30 and a base 12. Rather, the holder may be integrally formed as a single workpiece. Moreover, resilient abutment 32 and bracket 34 are not necessarily parts of an assembly 30, but could be separate components.

The contacts 60 are not necessarily made from a strip of metal 61 in all embodiments, but rather may be formed from wire, a conductive film, or another suitable material such as an electrically conductive elastomer. The contacts 60 are not necessarily resilient in all embodiments, however the likelihood of intermittent connections may increase if the contacts 60 are not resilient.

It will also be appreciated that the holder 10 can be used to hold various types of integrated circuit cards, not just SIM cards. These include Secure Digital (SD) memory cards, mini SD memory cards, micro SD memory cards and Sony® Memory Stick™ cards for example.

Other modifications will be apparent to those skilled in the art and, therefore, the invention is defined in the claims.

What is claimed is:

1. An apparatus comprising:
    a holder for an integrated circuit card for mounting to a substantially flat surface, the holder comprising:
        a laterally extending non-conductive base;
        a pair of opposed abutments extending above said base, a first abutment of said pair of abutments being resilient such that a distance between said first abutment and a second abutment of said pair of abutments may be increased by urging said first abutment away from said second abutment;
        a first lip extending above said first abutment and projecting toward said second abutment;
        a second lip extending above or from said second abutment and projecting toward said first abutment;
        a plurality of resilient electrical contacts projecting upwardly from said base between said pair of abutments; and
        a first additional abutment extending above said base,
        said holder having a footprint that is smaller than a footprint of the integrated circuit card to be held; and
    a second additional abutment separate from said holder for mounting to said surface opposite said first additional abutment of said holder, said first and second additional abutments for limiting longitudinal integrated circuit card movement.

2. The apparatus of claim 1 wherein the footprint of said holder is about one-half of the size of the footprint of the integrated circuit card to be held.

3. The apparatus of claim 1 wherein said second additional abutment comprises an upstanding tab.

4. The apparatus of claim 1 wherein said limiting of longitudinal integrated circuit card movement is a first purpose of said second additional abutment and wherein said second additional abutment has a second purpose unrelated to said first purpose.

5. The apparatus of claim 4 wherein said second additional abutment is a shielding can and wherein said second purpose is shielding an RF transmitter.

6. A wireless communication device comprising an apparatus according to claim 1.

7. A method of mounting an apparatus for holding an integrated circuit card to a substantially flat surface, comprising:
    mounting a holder to said surface, the holder comprising:
        a laterally extending non-conductive base;
        a pair of opposed abutments extending above said base, a first abutment of said pair of abutments being resilient such that a distance between said first abutment and a second abutment of said pair of abutments may be increased by urging said first abutment away from said second abutment;
        a first lip extending above said first abutment and projecting toward said second abutment;
        a second lip extending above or from said second abutment and projecting toward said first abutment;
        a plurality of resilient electrical contacts projecting upwardly from said base between said pair of abutments; and
        a first additional abutment extending above said base,
        said holder having a footprint that is smaller than a footprint of the integrated circuit card to be held; and
    further mounting to said surface, opposite said first additional abutment, a second additional abutment separate from said holder, said first and second additional abutments for limiting longitudinal integrated circuit card movement.

8. The method of claim 7 wherein the footprint of said holder is about one-half of the size of the footprint of the integrated circuit card to be held.

9. The method of claim 7 wherein said second additional abutment comprises an upstanding tab.

10. The method of claim 7 wherein said limiting of longitudinal integrated circuit card movement is a first purpose of said second additional abutment and wherein said second additional abutment has a second purpose unrelated to said first purpose.

11. The method of claim 10 wherein said second additional abutment is a shielding can and wherein said second purpose is shielding an RF transmitter.

* * * * *